(12) United States Patent
Takahashi (10) Patent No.: US 9,593,884 B2
(45) Date of Patent: Mar. 14, 2017

(54) PERMANENT MAGNET TYPE CYLINDRICAL MOLTEN-METAL AGITATOR AND MELTING FURNACE WITH PERMANENT MAGNET TYPE SUCTION PUMP

(71) Applicant: Kenzo Takahashi, Matsudo (JP)

(72) Inventor: Kenzo Takahashi, Matsudo (JP)

( * ) Notice: Subject to any disclaimer, the term of this patent is extended or adjusted under 35 U.S.C. 154(b) by 347 days.

(21) Appl. No.: 14/111,130

(22) PCT Filed: Nov. 5, 2012

(86) PCT No.: PCT/JP2012/078636
§ 371 (c)(1),
(2) Date: Oct. 10, 2013

(87) PCT Pub. No.: WO2014/024330
PCT Pub. Date: Feb. 13, 2014

(65) Prior Publication Data
US 2014/0079561 A1 Mar. 20, 2014

(30) Foreign Application Priority Data
Aug. 8, 2012 (JP) ................................. 2012-176275

(51) Int. Cl.
*F27D 27/00* (2010.01)
*F27D 3/14* (2006.01)
*H02K 44/04* (2006.01)

(52) U.S. Cl.
CPC ............. *F27D 27/005* (2013.01); *F27D 3/14* (2013.01); *H02K 44/04* (2013.01)

(58) Field of Classification Search
CPC .......... F27D 27/005; F27D 3/14; H02K 44/04
(Continued)

(56) References Cited

U.S. PATENT DOCUMENTS 7,651,656 B2 * 1/2010 Takahashi ............... F27D 27/00
266/234
2004/0234379 A1 11/2004 Miner et al.
(Continued)

FOREIGN PATENT DOCUMENTS

EP 2 206 998 A2 7/2010
EP 2 206 998 A3 7/2010
(Continued)

OTHER PUBLICATIONS

Office Action issued Jan. 29, 2015 in Canadian Patent Application No. 2,831,598.
(Continued)

*Primary Examiner* — Scott Kastler
*Assistant Examiner* — Michael Aboagye
(74) *Attorney, Agent, or Firm* — Oblon, McClelland, Maier & Neustadt, L.L.P.

(57) ABSTRACT

The agitator includes a furnace body that includes a molten metal room, and an agitating unit that agitates molten metal stored in the furnace body. The agitating unit includes a molten-metal driving room-forming part that applies a driving force to the molten metal, and forms a driving room of which both ends are opened; a pair of electrodes that is disposed in the driving room and makes current flow in the driving room under the presence of the molten metal; and a magnetic field unit which is formed of a permanent magnet disposed outside the furnace body, of which one pole of an N pole and an S pole faces the furnace body so that magnetic lines of force generated from the one pole cross the current, and which generates an electromagnetic three for driving the molten metal from one end toward the other end in the driving room.

4 Claims, 9 Drawing Sheets (58) Field of Classification Search
USPC .................. 266/233, 234, 236; 417/50, 53
See application file for complete search history.

(56) References Cited

U.S. PATENT DOCUMENTS

| | | |
|---|---|---|
| 2006/0133194 A1 | 6/2006 | Takahashi |
| 2009/0129197 A1 | 5/2009 | Isidorov |
| 2010/0244338 A1* | 9/2010 | Takahashi ............... F27B 19/04 266/200 |
| 2011/0074072 A1 | 3/2011 | Rauch |
| 2011/0248432 A1 | 10/2011 | Takahashi |
| 2012/0104669 A1 | 5/2012 | Takahashi |
| 2013/0192791 A1 | 8/2013 | Takahashi |
| 2014/0079561 A1 | 3/2014 | Takahashi |

FOREIGN PATENT DOCUMENTS

| | | |
|---|---|---|
| EP | 2 375 206 A1 | 10/2011 |
| JP | 2006 189229 | 7/2006 |
| JP | 2006 349293 | 12/2006 |
| JP | 4245673 | 1/2009 |
| JP | 4376771 | 9/2009 |
| JP | 2010-005647 A | 1/2010 |
| JP | 2010005647 * | 1/2010 .............. F27D 3/14 |
| JP | 2011 139611 | 7/2011 |
| JP | 2011 237056 | 11/2011 |
| JP | 2011 257129 | 12/2011 |

OTHER PUBLICATIONS

International Search Report Issued Feb. 5, 2013 in PCT/JP12/78636 filed Nov. 5, 2012.
Office Action issued Aug. 22, 2014 in Korean Patent Application No. 10-2013-7023852 (with English language translation).
U.S. Appl. No. 14/234,861, filed Jan. 24, 2014, Takahashi.
Combined Chinese Office Action and Search Report issued on Nov. 3, 2014 in Patent Application No. 201310322723.9 with English translation.
Written Opinion issued on Oct. 1, 2013 in Patent Application No. PCT/JP2012/078636 submitting English translation only.
U.S. Appl. No. 14/115,788, filed Nov. 5, 2013, Takahashi.
U.S. Appl. No. 14/126,171, filed Dec. 13, 2013, Takahashi.
Extended Search Report issued Sep. 26, 2014 in European Patent Application No. 12868335.6.
U.S. Appl. No. 14/825,893, filed Aug. 13, 2015, Takahashi.
U.S. Appl. No. 14/391,501, filed Oct. 9, 2014, Takahashi.

* cited by examiner

PERMANENT MAGNET TYPE CYLINDRICAL MOLTEN-METAL AGITATOR AND MELTING FURNACE WITH PERMANENT MAGNET TYPE SUCTION PUMP

TECHNICAL FIELD

The present invention relates to a permanent magnet type cylindrical molten-metal (melt) agitator that agitates molten metals of Al, Cu, Zn, Si, or an alloy of at least two of them, an Mg alloy, other metal, or the like; and a melting furnace with a permanent magnet type suction pump.

BACKGROUND ART

In the past, an electromagnetic agitator that generates a shifting field by making low-frequency current or high-frequency current flow in an electromagnetic coil in order to agitate a molten metal, a mechanical agitator that directly agitates the molten metal by a rotary impeller inserted into the molten metal, or the like has been used to agitate the molten non-ferrous metal or other metal. The main objects of all these devices are to uniformize the composition of the molten metal present in a furnace, to uniformize the temperature distribution of the molten metal, to reduce the time for melting in a melting furnace, and the like.

However, the device using the electromagnetic coil required large power consumption or complex maintenance and had a problem in that initial costs are high. Further, in the case of the mechanical agitator, there have been many problems in that the abrasion of the rotary blades is apt to occur, the costs for the replacement of the rotary impeller are very high per year, the stop of the furnace for a long time during the replacement cannot be avoided, and loss caused by down time is considerable, and the like. Further, a permanent magnet-rotation shifting field system also has started to be used in recent years. However, there also is a problem in that performance is limited due to the heat generated from a furnace reinforcing plate, which is made of stainless steel.

CITATION LIST

Patent Literature

Patent Literature 1: JP 4376771 B1
Patent Literature 2: JP 4245673 B1

SUMMARY OF INVENTION

Technical Problem

The invention has been made to solve the above-mentioned problems, and an object of the invention is to provide an energy-saving agitator that suppresses the amount of generated heat, is easy to use due to easy maintenance, has flexibility in an installation position, and can also adjust an agitating ability, and a melting furnace with a permanent magnet type suction pump.

A device and a melting furnace of the invention have the following structure.

A permanent magnet type molten-metal agitator according to the invention includes a furnace body that includes a molten metal room storing a molten metal and an agitating unit that agitates the molten metal stored in the furnace body. The agitating unit includes a molten-metal driving room-forming part that is disposed in the molten metal room, applies a driving force to the molten metal, and forms a driving room of which both ends are opened, a pair of electrodes that is disposed in the driving room and makes current flow in the driving room under the presence of the molten metal, and a magnetic field unit which is formed of a permanent magnet disposed outside the furnace body, of which one pole of an N pole and an S pole faces the furnace body so that magnetic lines of force generated from the one pole cross the current, and which generates an electromagnetic force for driving the molten metal from one end toward the other end in the driving room.

Further, the permanent magnet type molten-metal agitator according to the invention includes a furnace body that includes a molten metal room storing a molten metal and an agitating unit that agitates the molten metal stored in the furnace body. The agitating unit includes a molten-metal driving room-forming part that is disposed outside the furnace body and forms a driving room in cooperation with an outer side wall of the furnace body so that the driving room communicates with the molten metal room through a molten metal outlet and a molten metal inlet formed in the side wall, a pair of electrodes that is disposed in the driving room and makes current flow in the driving room under the presence of the molten metal, and a magnetic field unit which is formed of a permanent magnet disposed outside the furnace body and the molten-metal driving room-forming part, of which one pole of an N pole and an S pole faces the molten-metal driving room-forming part so that magnetic lines of force generated from the one pole cross the current, and which generates an electromagnetic force for making the molten metal flow into the molten metal room from the driving room and making the molten metal flow out from the molten metal room to the driving room.

Further, the permanent magnet type molten-metal agitator according to the invention includes a furnace body that includes a molten metal room storing a molten metal and an agitating unit that agitates the molten metal stored in the furnace body. The agitating unit includes a molten-metal driving room-forming part that is disposed outside the furnace body and includes a driving room so that the driving room communicates with the molten metal room through a molten metal outlet and a molten metal inlet formed in a side wall of the furnace body, a pair of electrodes that is disposed in the driving room and makes current flow in the driving room under the presence of the molten metal, and a magnetic field unit which is formed of a permanent magnet received in a receiving space of the magnetic field unit formed by the molten-metal driving room-forming part and the side wall of the furnace body so as to be isolated from the molten metal, of which one pole of an N pole and an S pole faces the driving room of the molten-metal driving room-forming part so that magnetic lines of force generated from the one pole cross the current, and which generates an electromagnetic force for making the molten metal flow into the molten metal room from the driving room and making the molten metal flow out from the molten metal room to the driving room.

A melting furnace with a permanent magnet type suction pump according to the invention, the melting furnace includes a furnace body that includes a molten metal room storing a molten metal and a pump unit that is disposed in the furnace body and discharges the molten metal to the outside. The pump unit includes a molten-metal driving room-forming part that applies a driving force to the molten metal and forms a driving room of which one end is opened in the molten metal room and the other end is opened outside the molten metal room, a pair of electrodes that is disposed in the driving room and makes current flow in the driving room under the presence of the molten metal, and a magnetic field unit which is formed of a permanent magnet disposed outside the furnace body, of which one pole of an N pole and an S pole faces the furnace body so that magnetic lines of force generated from the one pole cross the current, and which generates an electromagnetic force for driving the molten metal from one end toward the other end in the driving room.

DESCRIPTION OF EMBODIMENTS

Permanent magnet type molten-metal (melt) agitators according to embodiments of the invention will be described below with reference to the drawings. Meanwhile, scales in the respective drawings to be described below are not the same and a scale is arbitrarily selected in each drawing.

Figure 1:
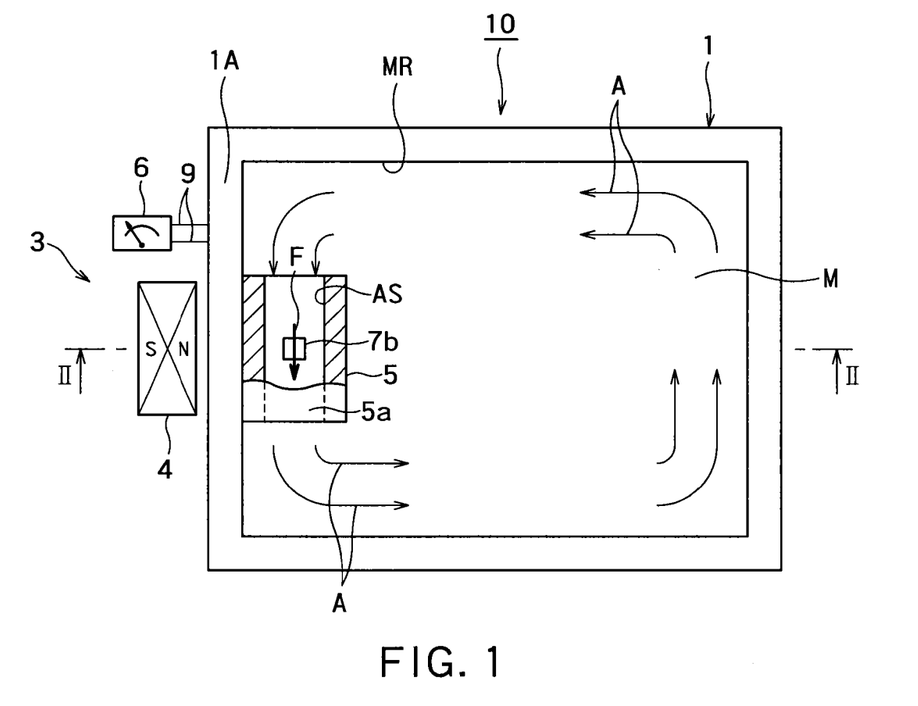
FIG. 1 is a plan view of a first embodiment of the invention.
Figure 2:
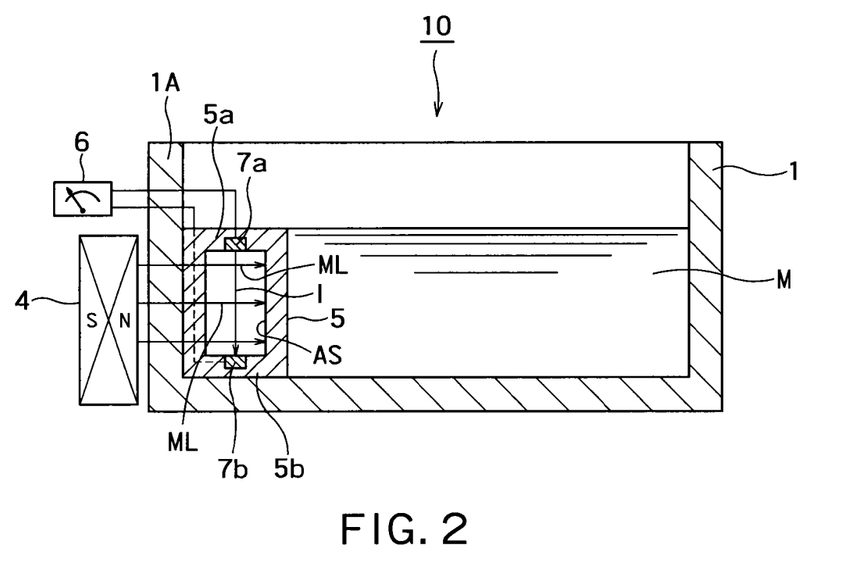
FIG. 2 is a longitudinal cross-sectional view taken along line II-II of FIG. 1.

FIG. 1 is a plan view of a first embodiment of the invention and FIG. 2 is a longitudinal cross-sectional view taken along line II-II of FIG. 1.

As understood from FIG. 1, a permanent magnet type molten-metal agitator 10 according to this embodiment includes a furnace body 1 that includes a molten metal room MR, and a agitating unit 3 that is mounted on the furnace body 1.

The agitating unit 3 includes a permanent magnet type magnetic field unit 4, a cylindrical molten-metal driving room-forming part 5, and a power source control panel 6 connected to a power source. The magnetic field unit 4 is a so-called single-pole permanent magnet. The magnetic field unit 4 is provided outside a side wall 1A of the furnace body 1, the molten-metal driving room-forming part 5 is provided in the furnace body 1, and the power source control panel 6 is provided at an arbitrary position outside the furnace body 1. Particularly, as understood from FIG. 1, the agitating unit 3 is to rotationally drive counterclockwise a molten metal M, which is stored in the furnace body 1, by an electromagnetic force according to Fleming's left-hand rule as illustrated by arrows A in, for example, FIG. 1. As understood from FIG. 2, the magnetic field unit 4 and the molten-metal driving room-forming part 5 face each other with the side wall 1A of the furnace body 1 interposed therebetween.

Figure 3:
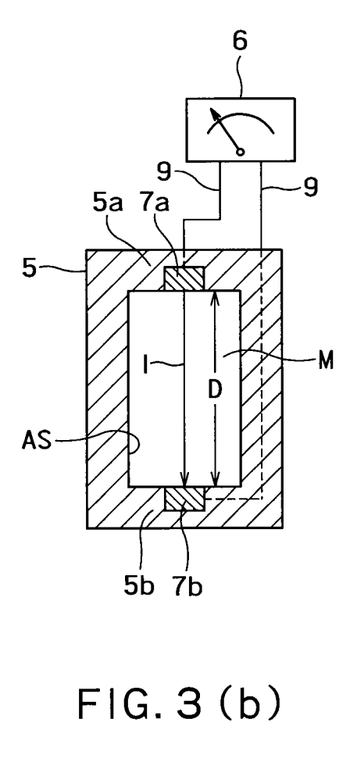
FIG. 3(a) is an explanatory side view of a molten-metal driving room-forming part and FIG. 3(b) is a longitudinal cross-sectional view taken along line IIIb-IIIb of FIG. 3(a).

The structure of the cylindrical molten-metal driving room-forming part 5 is particularly illustrated in FIGS. 3(a) and 3(b). FIG. 3(a) is a front view of the molten-metal driving room-forming part 5 of which a part is illustrated in breakaway view, and FIG. 3(b) is a longitudinal cross-sectional view taken along line IIIb-IIIb of FIG. 3(a). As understood from FIGS. 3(a) and 3(b), the molten-metal driving room-forming part 5 has the shape of a slightly long cylinder and the cross-section of the molten-metal driving room-forming part 5 has the shape of a frame. As described below, the interior space of the molten-metal driving room-forming part 5 is used as an accelerating space AS (driving room DR) in which an electromagnetic force F (directed to the left or right side in FIG. 3(a)) according to Fleming's left-hand rule is applied to the molten metal M and the molten metal M is driven so as to be accelerated. A pair of electrodes 7a and 7b is embedded into the inner surfaces of a top plate 5a and a bottom plate 5b of the molten-metal driving room-forming part 5. Direct current I flows between these electrodes 7a and 7b, for example, into the electrode 7b from the electrode 7a (or into the electrode 7a from the electrode 7b) under the presence of the molten metal M. These electrodes 7a and 7b are connected to the power source control panel 6 through lines 9, 9. A part of these lines 9, 9 are embedded into the molten-metal driving room-forming part 5. The reason for this is to lengthen the life span of the agitating unit by preventing the direct contact between the high-temperature molten metal M and the lines 9, 9.

As understood from FIG. 3(a), the positions of the electrodes 7a and 7b embedded into the molten-metal driving room-forming part 5 correspond to the substantially middle of the length L of the molten-metal driving room-forming part 5. In addition, it is preferable that the length L be equal to or larger than a distance D between the electrodes 7a and 7b. The reason for that is to make current, which flows between the electrodes 7a and 7b, flow only in the accelerating space AS so that the current does not leak to the outside of the accelerating space AS of the molten-metal driving room-forming part 5. Meanwhile, since the electrodes 7a and 7b come into contact with the molten metal M, the damage to the electrodes 7a and 7b cannot be avoided. For this reason, the electrodes 7a and 7b are provided so as to be capable of being replaced in not only this embodiment but also other embodiments to be described below.

The power source control panel 6 is adapted to adjust the outputs to the lines 9, 9 in terms of both a voltage and current. Further, the power source control panel 6 is also adapted so as to be capable of switching polarities of a pair of output terminals.

The magnetic field unit 4 is formed of a permanent magnet as described above and is used as a so-called single-pole magnet. That is, the magnetic field unit 4 is disposed so that one (N pole in this embodiment) of an S pole and an N pole faces the furnace body 1. That is, particularly, as understood from FIG. 2, the magnetic field unit 4 is disposed so that an N pole faces the molten-metal driving room-forming part 5 with the side wall 1A of the furnace body 1 interposed therebetween. A gap is formed between the magnetic field unit 4 and the side wall 1A in FIG. 2, but the gap may not be formed so that the magnetic field unit 4 is installed close to the molten-metal driving room-forming part 5 as much as possible. Due to this structure, particularly, as understood from FIG. 2, magnetic lines ML of force generated from the N pole of the magnetic field unit 4 are substantially vertical to the current I that flows between the electrodes 7a and 7b. Accordingly, particularly, as understood from FIG. 1, an electromagnetic force F according to Fleming's left-hand rule is generated. The molten metal M stored in the accelerating space AS is driven by the electromagnetic force F. Accordingly, eventually, the molten metal M stored in the furnace body 1 is rotationally driven counterclockwise as illustrated by the arrows A in FIG. 1. In this case, it is possible to change the value of the current I flowing between the electrodes 7a and 7b and to control the magnitude of the electromagnetic force F by controlling an output from the power source control panel 6. Accordingly, it is possible to control a force for rotationally driving the molten metal M, that is, the rotational speed of the molten metal M. In addition, it is possible to change the direction of the electromagnetic force F by switching the polarities of the outputs to the lines 9, 9 with the power source control panel 6, so that it is possible to make the rotation direction of the molten metal M, which is stored in the furnace body 1, reverse.

Figure 4:
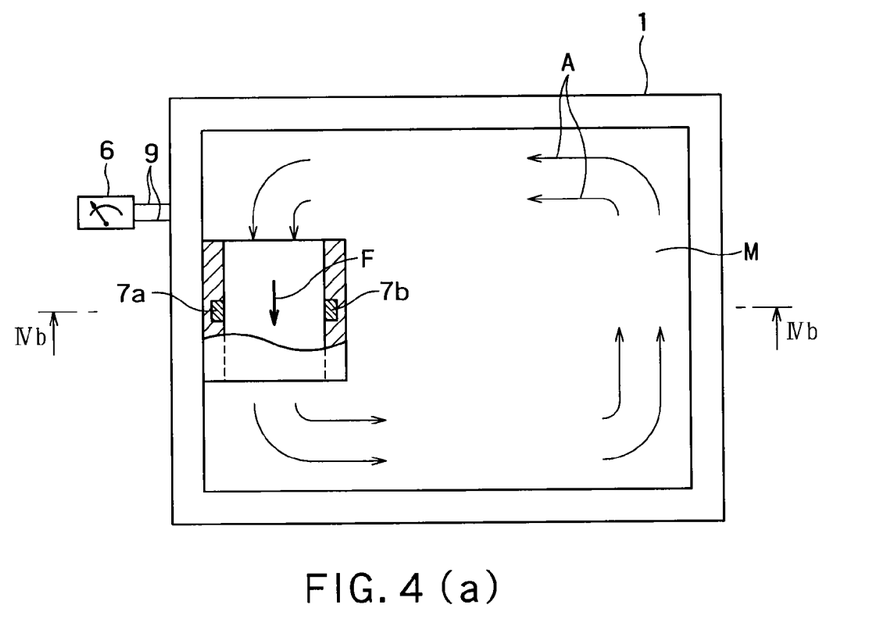
FIG. 4(a) is a plan view of a second embodiment of the invention and FIG. 4(b) is a longitudinal cross-sectional view taken along line IVb-IVb of FIG. 4(a).

The magnetic field unit 4 has been disposed on the lateral side of the furnace body 1 in the above-mentioned first embodiment. However, the magnetic field unit 4 may be disposed below the furnace body 1 instead. This is illustrated in FIGS. 4(a) and 4(b) as a second embodiment. FIG. 4(a) is a plan view and FIG. 4(b) is a longitudinal cross-sectional view taken along line IVb-IVb of FIG. 4(a). In particular, as understood from FIG. 4(b), a molten-metal driving room-forming part 5 is disposed so that current I flows in a lateral direction in FIG. 4(b). Accordingly, magnetic lines ML of force extend in a vertical direction and current I flows in the lateral direction, so that both the magnetic lines ML of force and the current I are substantially vertical to each other. Accordingly, as understood from FIG. 4(a), an electromagnetic force F for driving the molten metal M is generated as in FIG. 1. Therefore, the molten metal M is rotationally driven as illustrated by arrows A. Note that, in this embodiment, the same members as those of the above-mentioned first embodiment are denoted by the same reference numerals and the detailed description thereof will not be repeated. This is similar in all embodiments to be described below.

Figure 5A:
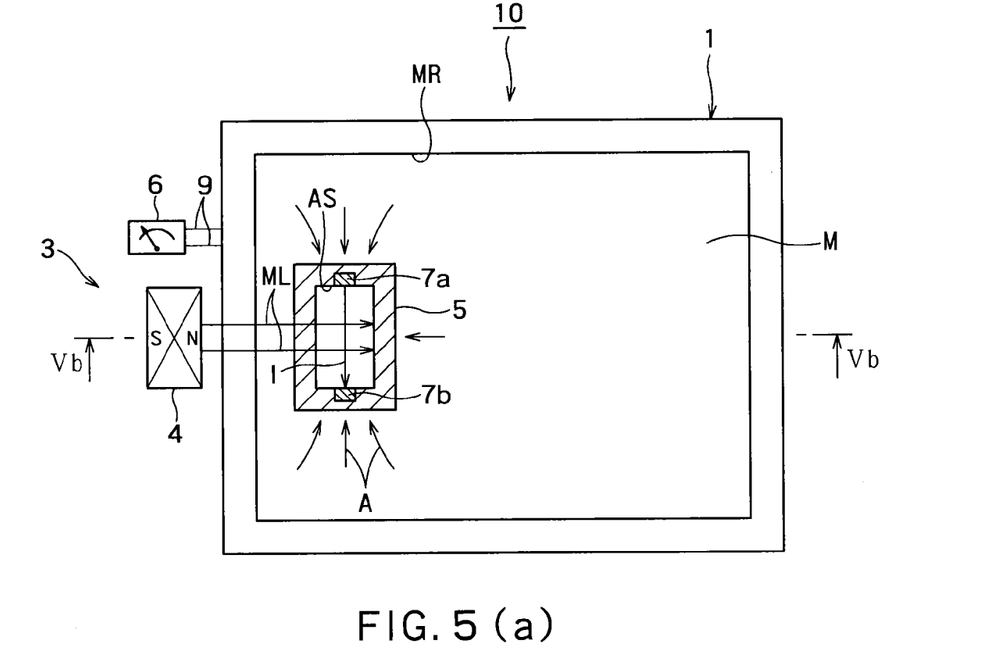
FIG. 5(a) is a plan view of a third embodiment of the invention and FIG. 5(b) is a longitudinal cross-sectional view taken along line Vb-Vb of FIG. 5(a).
Figure 5B:
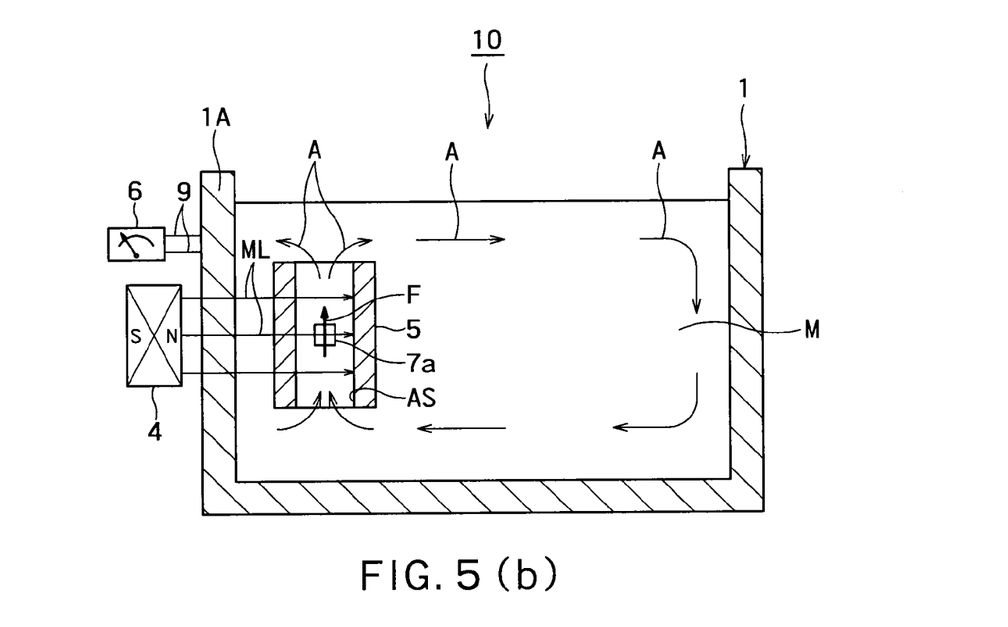

FIGS. 5(a) and 5(b) illustrate a third embodiment where molten metal M stored in a furnace body 1 is rotationally driven in a vertical direction as illustrated by arrows A in FIG. 5(b). FIG. 5(a) is a plan view and FIG. 5(b) is a longitudinal cross-sectional view taken along line Vb-Vb of FIG. 5(a). In this embodiment, current I and magnetic lines ML of force are generated so that an electromagnetic force F for allowing molten metal M to be sucked from below and discharged to the upper side by a molten-metal driving room-forming part 5 is generated as illustrated in FIG. 5(b). This will be described in more detail below.

The molten-metal driving room-forming part 5 illustrated in FIGS. 3(a) and 3(b) is assembled in a furnace body 1 in a so-called upright state by intended means. As understood from FIG. 5(a), current I flows between electrodes 7a and 7b in a vertical direction in FIG. 5(a) and the magnetic lines ML of force flow in a lateral direction in FIG. 5(a). Accordingly, an upward electromagnetic force F according to Fleming's rule is generated as illustrated in FIG. 5(b). Therefore, the molten metal M stored in the furnace body 1 is rotationally driven in the vertical direction as illustrated by arrows A illustrated in FIG. 5(b).

As understood from the description of the above-mentioned first to third embodiments, the electromagnetic force F according to Fleming's left-hand rule is applied to the molten metal M stored in the accelerating space AS of the cylindrical molten-metal driving room-forming part 5 in order to drive the molten metal M. That is, in the embodiment of the invention, such an accelerating space AS only has to be formed by any means. Accordingly, the molten-metal driving room-forming part 5 itself does not need to have a cylindrical shape in order to have such an accelerating space AS. A fourth embodiment of the invention, which is formed in consideration of this, will be described below.

Figure 6:
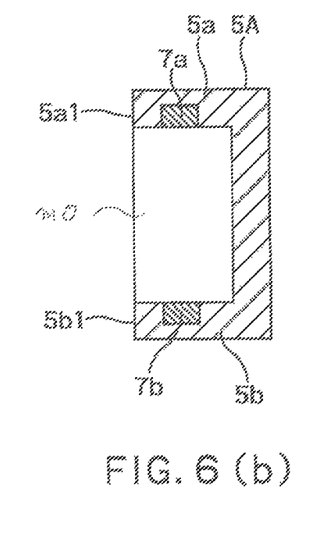
FIG. 6(a) is an explanatory side view of another molten-metal driving room-forming part and FIG. 6(b) is a longitudinal cross-sectional view taken along line VIb-VIb of FIG. 6(a).

FIGS. 6(a) and 6(b) illustrate a molten-metal driving room-forming part 5A that is used in fourth and fifth embodiments. The molten-metal driving room-forming part 5A is formed by cutting one side surface of the molten-metal driving room-forming part 5 illustrated in FIG. 3(a), and the cross-section of the molten-metal driving room-forming part 5A has a U shape, that is, the shape of a lateral channel. The molten-metal driving room-forming part 5A may be used instead of the molten-metal driving room-forming part 5 of FIG. 3. However, in this case, the molten-metal driving room-forming part 5A is not used alone and is used so as to form the accelerating space AS in cooperation with the side wall 1A (bottom wall 1B) of the furnace body 1. That is, the molten-metal driving room-forming part 5A is used so that an end face 5a1 of a top plate 5a and an end face 5b1 of a bottom plate 5b come into contact with the inner surface of the furnace body 1 to form the accelerating space AS.

Figure 7:
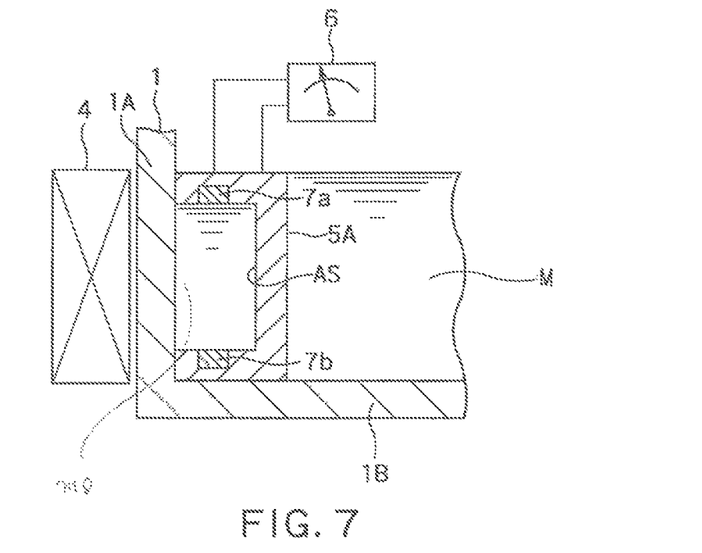
FIG. 7 is a side cross-sectional view illustrating a part of a fourth embodiment of the invention.
Figure 8:
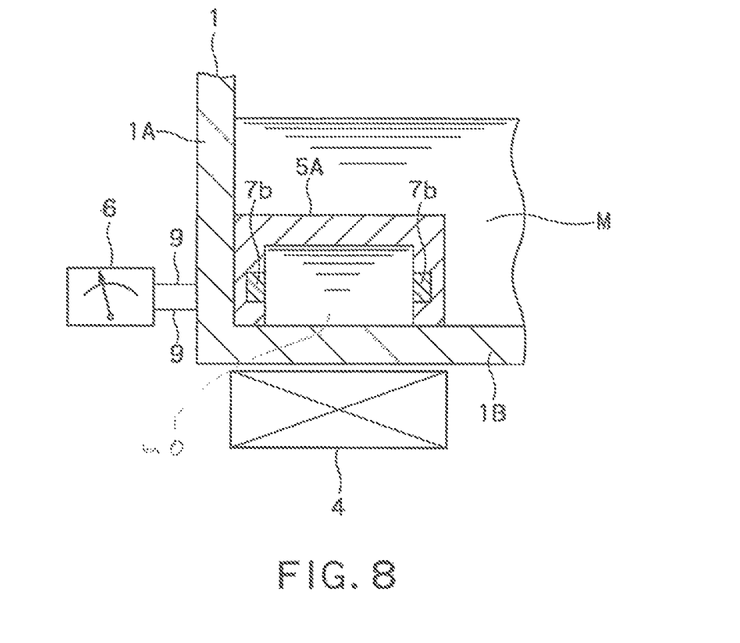
FIG. 8 is a side cross-sectional view illustrating a part of a fifth embodiment of the invention.

FIGS. 7 and 8 illustrate fourth and fifth embodiments that are formed on the basis of such a technical idea. That is, FIG. 7 illustrates a cross-section corresponding to FIG. 2 of the first embodiment, and illustrates a fourth embodiment that uses the molten-metal driving room-forming part 5A. FIG. 8 illustrates a cross-section corresponding to FIG. 4(b) of the second embodiment, and illustrates a fifth embodiment that uses the molten-metal driving room-forming part 5A.

In the above-mentioned first to fifth embodiments, the accelerating space AS has been formed by the molten-metal driving room-forming part 5 or 5A that is received by the furnace body 1. However, since the accelerating space AS only has to be provided as the basic technical idea of the invention, the molten-metal driving room-forming part 5 or 5A does not need to be necessarily received in the furnace body 1 and the accelerating space AS only has to be formed by any means. A sixth embodiment, which is formed according to such a technical idea, will be described below.

Figure 9:
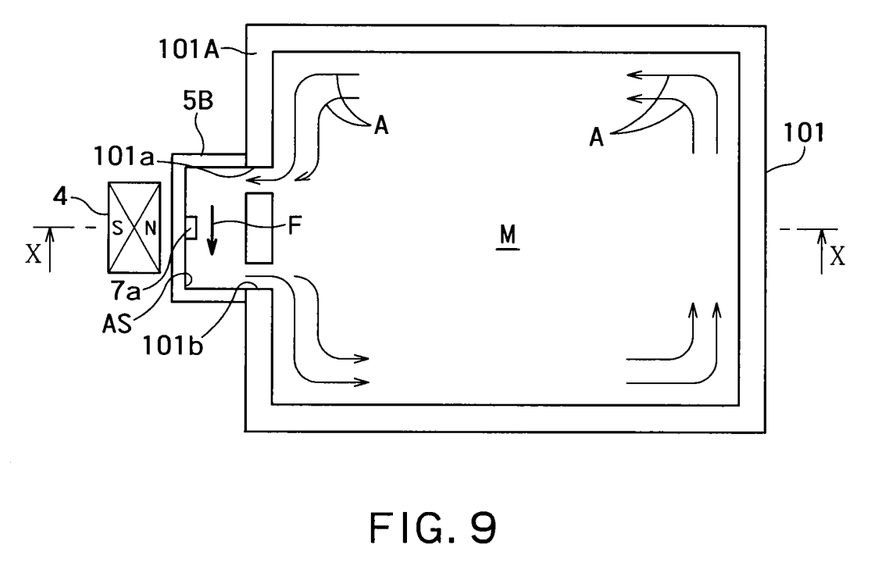
FIG. 9 is a plan view of a sixth embodiment of the invention.
Figure 10:
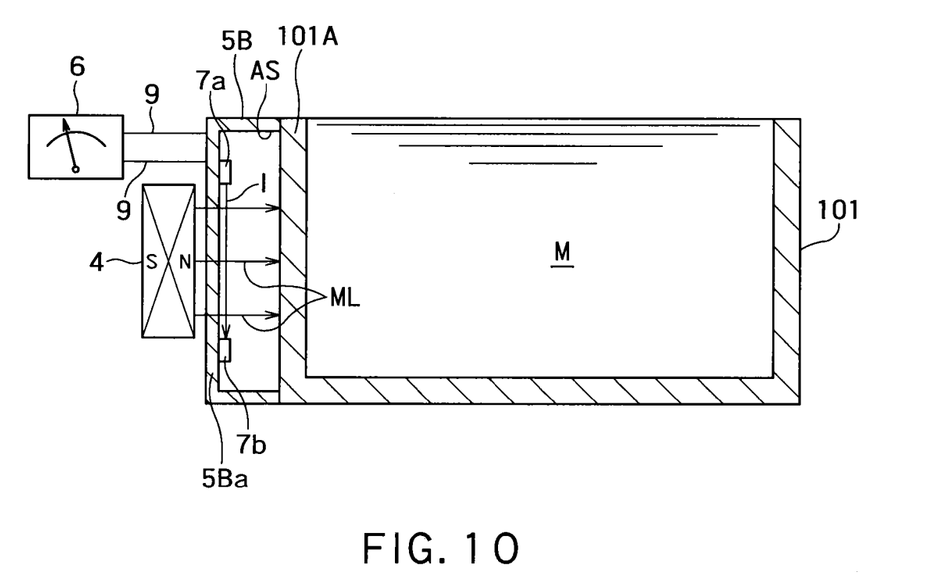
FIG. 10 is a longitudinal cross-sectional view taken along line X-X of FIG. 9.
Figure 11:
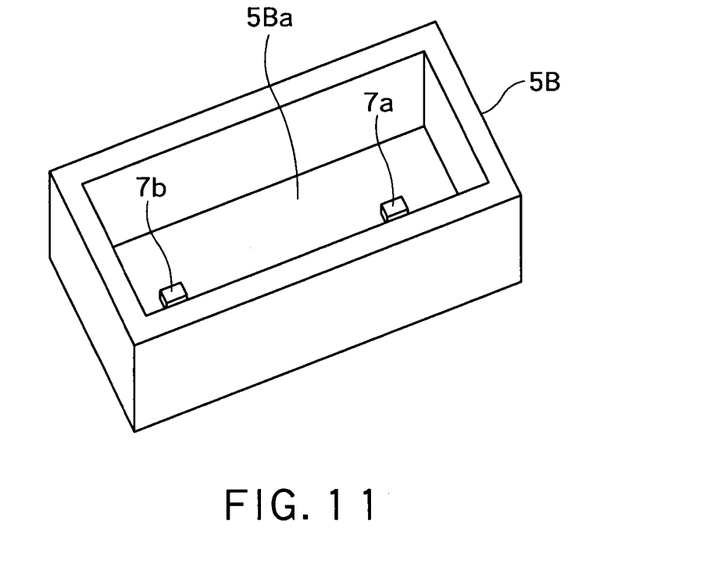
FIG. 11 is a perspective view of a molten-metal driving room-forming part of FIG. 9.

FIGS. 9 to 11 illustrate a sixth embodiment. In the sixth embodiment, a molten-metal driving room-forming part 5B is mounted on the outside of the furnace body 1 to form an accelerating space AS. This will be described in more detail below.

A molten-metal driving room-forming part 5B illustrated in FIG. 11 is used in the sixth embodiment. The molten-metal driving room-forming part 5B has the shape of a container of which only a top plate portion among six surfaces is opened, and is mounted while electrodes 7a and 7b protrude from the inner surface of a bottom plate 5Ba. On the other hand, particularly, as understood from FIG. 9, a side wall 101A of a furnace body 101 is provided with an outlet 101a from which molten metal M stored in the furnace body flows out and an inlet 101b through which molten metal M flows into the furnace body from the outside. However, as understood from FIGS. 9 and 10, the molten-metal driving room-forming part 5B illustrated in FIG. 11 is hermetically mounted on the side wall 101A of the furnace body 101 from the outside. Further, as in each of the above-mentioned embodiments, a magnetic field unit 4 is provided so as to face the electrodes 7a and 7b in the lateral direction in FIG. 10 with the bottom plate 5Ba of the molten-metal driving room-forming part 5B interposed therebetween. Due to the above-mentioned structure, current I flowing between the electrodes 7a and 7b and magnetic lines ML of force generated from the magnetic field unit 4 cross each other so as to be substantially vertical to each other, so that an electromagnetic force F illustrated in FIG. 9 is obtained. The molten metal M stored in the accelerating space AS is driven by the electromagnetic force F in the same manner as described above, so that the molten metal M stored in the furnace body 101 flows out from the outlet 101a and enters the accelerating space AS and the molten metal M stored in the accelerating space AS flows into the furnace body 101 from the inlet 101b. Accordingly, the molten metal M stored in the furnace body 1 is rotationally driven as illustrated by arrows A of FIG. 9.

Figure 12:
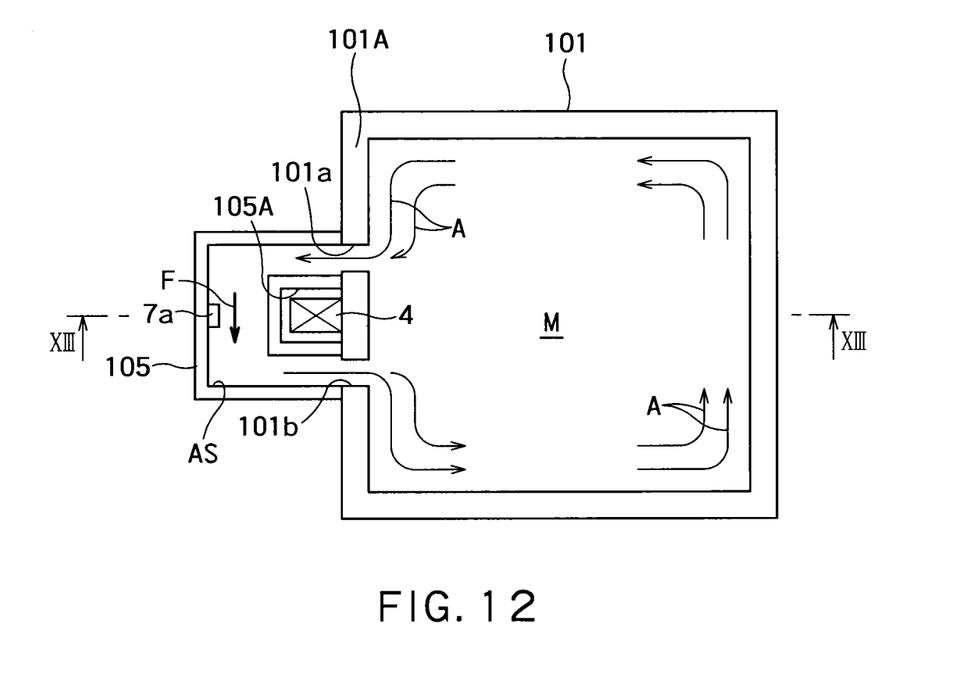
FIG. 12 is a plan view of a seventh embodiment of the invention.
Figure 13:
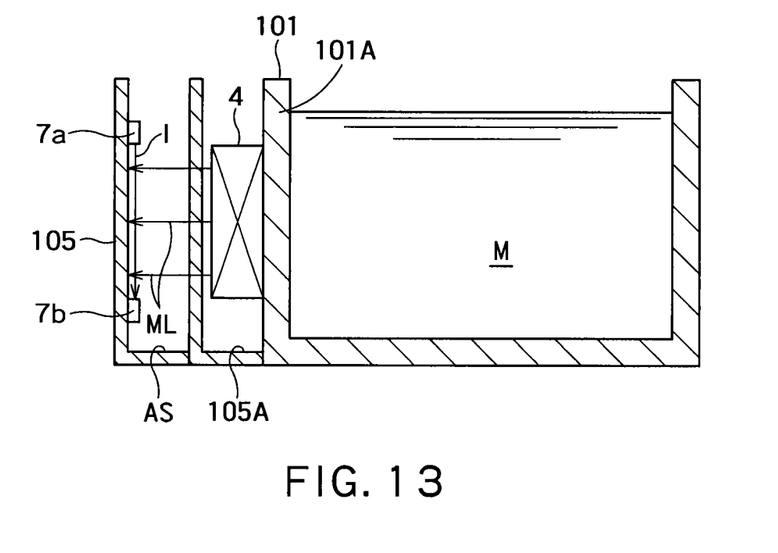
FIG. 13 is a longitudinal cross-sectional view taken along line XIII-XIII of FIG. 12.

FIGS. 12 and 13 illustrate a seventh embodiment. The seventh embodiment shows an example where the magnetic field unit 4 is disposed between the electrodes 7a and 7b and the furnace body 101 so as to be isolated. This will be described in more detail below.

In the seventh embodiment, a separate molten-metal driving/storing unit 105 is hermetically mounted on the furnace body 101. The molten-metal driving/storing unit 105 has an accelerating space AS so as to have a function of forming a receiving space 105A, in which the magnetic field unit 4 is received, together with the side wall 101A of the furnace body 101 in addition to a function as a so-called original molten-metal driving room-forming part. Since the receiving space 105A is naturally isolated from the molten metal M, the magnetic field unit 4 does not come into contact with the molten metal M.

In more detail, as understood from FIG. 13, the electrodes 7a and 7b are provided in the accelerating space AS of the molten-metal driving/storing unit 105 in a vertical direction in FIG. 13. Only the upper side of the accelerating space AS is opened as understood from FIG. 13, and the accelerating space AS communicates with the furnace body 101 through the outlet 101a and the inlet 101b as understood from FIG. 12. Further, the magnetic field unit 4 is received in the receiving space 105A. Accordingly, particularly, as understood from FIG. 13, current I flowing between the electrodes 7a and 7b and the magnetic lines ML of force generated from the magnetic field unit 4 cross each other, so that an electromagnetic force F is generated. As in the above-mentioned embodiments, the molten metal M is eventually driven along the arrows A as illustrated in FIG. 12.

Note that, the following structure may be employed as an embodiment different from the above-mentioned embodiments. That is, for example, the molten-metal driving room-forming part 5 illustrated in FIG. 2 may be adapted so as to be capable of continuously rotating about an axis perpendicular to the plane of FIG. 2. According to such a structure, it is possible to change the orientation of the molten-metal driving room-forming part 5 to the orientation of the molten-metal driving room-forming part 5 illustrated in FIG. 4(b) by the rotation. In this case, the orientation of the magnetic field unit 4 also needs to be changed so as to follow the change of the orientation of the molten-metal driving room-forming part 5.

Figure 14:
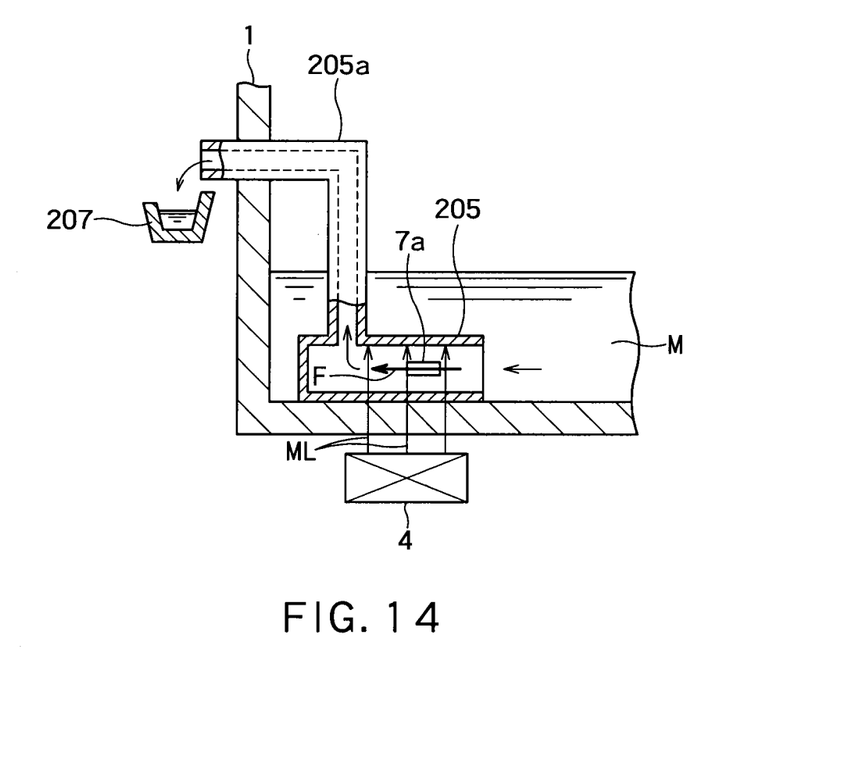
FIG. 14 is a side cross-sectional view of an eighth embodiment of the invention.

FIG. 14 illustrates still another embodiment of the invention. This embodiment shows an example where a molten metal pump capable of sending the molten metal M, which is stored in a furnace body, to the outside is formed by the change of the structure of a molten-metal driving room-forming part. In brief, a discharge pipe portion 205a communicating with the accelerating space AS is formed at a top plate portion by using a molten-metal driving room-forming part 205 that is formed by closing one end of the molten-metal driving room-forming part 5 illustrated in, for example, FIG. 1.

Further, a pair of electrodes 7a and 7b (only 7a is illustrated) is disposed in the thickness direction of the plane of FIG. 14. Accordingly, an electromagnetic force F is generated as described above, so that the molten metal M is driven to the left side from the right side as illustrated by arrows in FIG. 14, is discharged to the outside from the end of the discharge pipe portion 205a, and is received by a receiving box 207.

The N pole of the permanent magnet of the magnetic field unit 4 has faced the molten-metal driving room-forming part in each of the above-mentioned embodiments, but it is natural that an S pole may face the molten-metal driving room-forming part.

One characteristic in the embodiments of the invention is to form a driving room, to make current I flow between a pair of electrodes provided in the driving room, and to apply a magnetic field to the current I so that the molten metal is efficiently agitated by an agitator. In general, if a material to be agitated (molten metal or molten non-ferrous metal in the invention) is fluid, a force applied to the fluid is dispersed in all directions.

For this reason, it is not possible to efficiently agitate the material. However, the inventor found that the magnitude and direction of an agitating force are regulated and the molten metal can be driven with high efficiency when the agitating force is applied to the molten metal in a limited space (driving room DR). The invention is made on the basis of knowledge that is really unique to the inventor. As for the embodiment level, the limited space (driving room DR) is formed by a cylindrical or U-shaped (channel type) molten-metal driving room-forming part 5.

The inventor performed experiments for confirming the effect of the invention. The results of the experiments are presented below.

The following agitating flow speeds Vm/min were obtained under a cross-section of 20×40 mm and a magnetic field of 0.1 T.

| Current (Amp) | Flow speed (V) | Pressure (P) | Flow rate (m³/min) (Al conversion) |
|---|---|---|---|
| 20 Amp | 15 to 20 | 0.05 Kg/cm² | 0.043 to 0.057 |
| 40 Amp | 35 to 45 | 0.1 Kg/cm² | 0.1 to 0.13 |
| 80 Amp | 50 to 60 | 0.15 Kg/cm² | 0.144 to 0.173 |

It is possible to further increase these values by increasing the value of current and the intensity of a magnetic field. More exactly, it is considered that flow speed and pressure are proportional to the value of current, but variation was generated according to the stability or instability of the connection between the lines 9, 9 as power supply cables and electrodes 7a and 7b.

The material to be agitated is the molten metal and the molten non-ferrous metal in this case, but both molten metal and molten non-ferrous metal have high electrical conductivity (have low resistance). Accordingly, a voltage applied between the electrodes is small. For this reason, power consumption can be suppressed so as to be very small. Even though the invention is applied to a so-called large furnace, it is estimated that the value of power consumption is 10 Kw or less. Considering that an agitator in the related art (the most common linear furnace bottom agitator) requires power consumption of 500 Kw or more, it is found that the permanent magnet type molten-metal agitator of the invention is superior.

As described above, in the embodiments of the invention, at the time of the drive of the molten metal, the driving room DR (accelerating space AS) is formed, the current I flows in the driving room, the current I is made not to leak to the outside of the driving room DR, a magnetic field is applied to the current I so that an electromagnetic force F according to Fleming's rule is generated, and a driving force is applied to the molten metal M stored in the driving room DR serving as a closed space by the electromagnetic force F. Accordingly, it is possible to rotationally drive the molten metal M stored in the furnace body with high efficiency or to discharge the molten metal M stored in the furnace body to the outside with high efficiency by reliably driving the molten metal M that is stored in the driving room DR.

The invention claimed is:

1. A permanent magnet type molten-metal agitator for agitating a molten metal stored in a molten metal room of a furnace body, the molten metal room is formed by a side wall and a bottom wall, the agitator comprising:
    a molten-metal driving room-forming part that is a different body from that of the furnace body and horizontally disposed in the molten metal room, forms a driving room in the furnace body for applying a driving force to the molten metal in the molten metal room to drive horizontally the molten metal, both end of the molten metal room are opened,
    a pair of electrodes that is disposed in the driving room, and
    a magnetic field unit which is disposed outside the furnace body, wherein
    molten-metal driving room-forming part forms the driving room in corporation with an inner surface of the side wall,
    the molten-metal driving room-forming part has a channel shape, the cross-section thereof is U-shaped, the molten-metal driving room-forming part has a main opening which is an opening part of the U-shape to be covered so as to form the driving room, a first opening at the one end and a second opening at the other end,
    the molten-metal driving room-forming part has a bottom wall portion and a pair of side wall portions facing each other, the side wall portions each having top surfaces, the top surfaces horizontally being contacted on the inner surface of the side wall of the molten metal room so that the main opening of the molten-metal driving room-forming part is covered by the inner surface of the side wall of the molten metal room in order to form the driving room,
    each of electrodes is disposed on each of the inner surfaces of each of the side wall portions of the molten-metal driving room-forming part and the electrodes are able to make electric current flow vertically the driving room under the presence of the molten metal,
    a magnetic field unit which is formed of a permanent magnet and is disposed outside the furnace body, a magnetic field unit faces horizontally the side wall of the molten metal room, of which one pole of an N pole and an S pole faces the side wall of the molten metal room so that horizontal magnetic lines of force outgoing from or incoming into the one pole cross the vertically flowing electric current in the driving room of the molten-metal driving room-forming part, and which generates an electromagnetic force for horizontally driving the molten metal from one end toward the other end in the driving room.

2. A melting furnace with a permanent magnet type molten-metal agitator comprising:
    a furnace body that includes a molten metal room for storing a molten metal, which is formed by a side wall and a bottom wall, and
    an agitator according to claim 1, the driving room of the molten-metal driving room-forming part directly leading to the molten metal room of the furnace body via the first and second openings, respectively.

3. A permanent magnet type molten-metal agitator for agitating a molten metal stored in a molten metal room of a furnace body, the molten metal room is formed by a side wall and a bottom wall, the agitator comprising:
    a molten-metal driving room-forming part that is a different body from that of the furnace body and horizontally disposed in the molten metal room, forms a driving room in the furnace body for applying a driving force to the molten metal in the molten metal room to drive horizontally the molten metal, both end of the molten metal room are opened,
    a pair of electrodes that is disposed in the driving room, and
    a magnetic field unit which is disposed outside and under the bottom wall of the molten metal room, wherein
    molten-metal driving room-forming part forms the driving room in corporation with an inner surface of the bottom wall,
    the molten-metal driving room-forming part has a channel shape, the cross-section thereof is U-shaped, the molten-metal driving room-forming part has a main opening which is an opening part of the U-shape to be covered so as to form the driving room, a first opening at the one end and a second opening at the other end,
    the molten-metal driving room-forming part has a bottom wall portion and a pair of side wall portions facing each other, the side wall portions each having top surfaces, the top surfaces vertically being contacted on the inner surface of the bottom wall of the molten metal room so that the main opening of the molten-metal driving room-forming part is covered by the inner surface of the bottom wall of the molten metal room in order to form the driving room,
    each of electrodes is disposed on each of inner surfaces of each of the side wall portions of the molten-metal driving room-forming part and the electrodes are able to make electric current flow horizontally in the driving room under the presence of the molten metal,
    a magnetic field unit which is formed of a permanent magnet and is disposed outside and under the bottom wall of the molten metal room, a magnetic field unit faces vertically the bottom wall of the molten metal room, of which one pole of an N pole and an S pole faces the bottom wall of the molten metal room so that vertical magnetic lines of force outgoing from or incoming into the one pole cross the horizontally flowing electric current in the driving room of the molten-metal driving room-forming part, and which generates electromagnetic force for horizontally driving the molten metal from one end toward the other end in the driving room.

4. A melting furnace with a permanent magnet type molten-metal agitator comprising:
a furnace body that includes a molten metal room for storing a molten metal, which is formed by a side wall and a bottom wall, and
an agitator according to claim 3, the driving room of the molten-metal driving room-forming part directly leading to the molten metal room of the furnace body via the first and second openings, respectively.

* * * * *